(12) United States Patent
Cho et al.

(10) Patent No.: US 12,078,772 B2
(45) Date of Patent: Sep. 3, 2024

(54) GAS SATURATION DISTRIBUTION MONITORING IN HYDROCARBON RESERVOIR

(71) Applicant: Landmark Graphics Corporation, Houston, TX (US)

(72) Inventors: Yongchae Cho, Houston, TX (US); Yang Cao, College Station, TX (US); Yevgeniy Zagayevskiy, Houston, TX (US); Terry W. Wong, Spring, TX (US); Yuribia Patricia Munoz, Pearland, TX (US)

(73) Assignee: Landmark Graphics Corporation, Houston, TX (US)

( * ) Notice: Subject to any disclaimer, the term of this patent is extended or adjusted under 35 U.S.C. 154(b) by 239 days.

(21) Appl. No.: 17/617,476

(22) PCT Filed: Jul. 29, 2019

(86) PCT No.: PCT/US2019/043835
§ 371 (c)(1),
(2) Date: Dec. 8, 2021

(87) PCT Pub. No.: WO2021/021097
PCT Pub. Date: Feb. 4, 2021

(65) Prior Publication Data
US 2022/0236444 A1 Jul. 28, 2022

(51) Int. Cl.
*E21B 47/00* (2012.01)
*E21B 43/16* (2006.01)
(Continued)

(52) U.S. Cl.
CPC .............. *G01V 7/06* (2013.01); *E21B 43/168* (2013.01); *E21B 49/087* (2013.01); *E21B 2200/20* (2020.05)

(58) Field of Classification Search
CPC .......... G01V 7/00; G01V 7/06; G01V 99/005; E21B 43/16; E21B 43/166; E21B 43/168;
(Continued)

(56) References Cited

U.S. PATENT DOCUMENTS

| 4,397,181 A | 8/1983 | Caldwell | |
|---|---|---|---|
| 7,047,170 B2 * | 5/2006 | Feldman | G01V 7/06 702/6 |

(Continued)

OTHER PUBLICATIONS

Adams et al., "Gravity Gains Momentum", 1992, pp. 6-11.
(Continued)

*Primary Examiner* — Kipp C Wallace
(74) *Attorney, Agent, or Firm* — Kilpatrick Townsend & Stockton LLP (57) ABSTRACT

A method includes collecting a first set of borehole gravity data at a first time step along a length of a first wellbore and collecting a second set of borehole gravity data at the first time step along a length of a second wellbore. The method also includes interpolating a third set of borehole gravity data at the first time step in an area between the first wellbore and the second wellbore using the first and the second sets of borehole gravity data. Further, the method includes determining a first fluid saturation and a fluid saturation change over time in a reservoir containing the first wellbore and the second wellbore using the first set, the second set, and the third set. Moreover, the method includes controlling wellbore production operations or wellbore injection operations at the first wellbore based on the fluid saturation change.

19 Claims, 8 Drawing Sheets

(51) Int. Cl.
*E21B 49/08* (2006.01)
*G01V 7/06* (2006.01)

(58) Field of Classification Search
CPC ........ E21B 43/20; E21B 47/00; E21B 43/162; E21B 2200/20
See application file for complete search history.

(56) References Cited

U.S. PATENT DOCUMENTS

| | | | | |
|---|---|---|---|---|
| 8,113,042 | B2* | 2/2012 | Donadille | G01V 7/00 73/152.05 |
| 9,651,708 | B2* | 5/2017 | Edwards | G01V 7/00 |
| 2009/0287464 | A1 | 11/2009 | Barnes | |
| 2010/0185422 | A1 | 7/2010 | Hoversten | |
| 2010/0286967 | A1* | 11/2010 | Vasilevskiy | G01V 7/00 703/2 |
| 2012/0271549 | A1* | 10/2012 | Edwards | G01V 7/00 702/6 |
| 2013/0066560 | A1* | 3/2013 | Dyatlov | G01V 7/06 702/11 |
| 2014/0083186 | A1* | 3/2014 | Levitt | E21B 47/00 73/382 R |
| 2014/0091803 | A1* | 4/2014 | Dodds | G01V 3/18 405/129.5 |
| 2015/0204996 | A1* | 7/2015 | Dashevsky | G01V 7/04 324/324 |
| 2016/0201453 | A1 | 7/2016 | Kaiser et al. | |
| 2019/0003292 | A1 | 1/2019 | Balan et al. | |
| 2019/0391288 | A1* | 12/2019 | Lin | G01V 1/302 |

OTHER PUBLICATIONS

Alixant, "In-Situ Residual Oil Saturation to Gas from Time-Lapse Borehole Gravity", Society of Petroleum Engineers, 30609, 1995, pp. 855-869.
Black et al., "Borehole Gravity—A Deep Investigation Logging Tool", pp. 1-4.
International Application No. PCT/US2019/043835, International Search Report and Written Opinion, Mailed On Apr. 24, 2020, 13 pages.
Popta et al., "Use of Borehole Gravimetry for Reservoir Characterisation and Fluid Saturation Monitoring", Society of Petroleum Engineers, 20896, 1990, pp. 151-160.

* cited by examiner

GAS SATURATION DISTRIBUTION MONITORING IN HYDROCARBON RESERVOIR

TECHNICAL FIELD

The present disclosure relates generally to hydrocarbon extraction. More specifically, but not by way of limitation, this disclosure relates to downhole gas saturation distribution monitoring in a hydrocarbon reservoir.

BACKGROUND

A hydrocarbon reservoir may include multiple wellbores drilled through a subterranean formation. The subterranean formation may include a rock matrix permeated by oil or gas that is to be extracted using the wellbores. Monitoring fluid propagation over time within the hydrocarbon reservoir may be beneficial for controlling hydrocarbon production at one or more of the wellbores drilled through the subterranean formation of the hydrocarbon reservoir.

Surface gravity surveys are often conducted for basin-scale density measurements in hydrocarbon exploration. The surface gravity measurements may provide information regarding potential locations of fluids within the hydrocarbon reservoirs. However, challenges exist with the use of surface gravity measurements. For example, the surface gravity measurements may provide coarse data resolution because the measurements are performed with only a vertical measurement component. Additionally, the surface gravity measurements may require a computationally expensive solution of an inverse problem to generate data useful to a wellbore operator. For example, a large matrix mathematical operation may be required to construct a three-dimensional earth property model that is representative of the hydrocarbon reservoir.

DETAILED DESCRIPTION

Certain aspects and features of the present disclosure relate to generating three-dimensional models representing fluid saturation in a hydrocarbon reservoir using multicomponent borehole gravity measurements from multiple wellbores located at the hydrocarbon reservoir. As used herein, the multicomponent borehole gravity measurements provide gravity data with multiple directional components (e.g., in an x-direction, a y-direction, and a z-direction). The multicomponent borehole gravity measurements may be performed by gravity sensors located along the length of tubing within each of the wellbores. In this manner, the gravity readings performed by the gravity sensors within the wellbores may include components in each of the x, y, and z coordinate directions. Gravity data associated with locations between the wellbores may be interpolated using an interpolation technique, such as simple kriging. Using the multicomponent borehole gravity measurements from the wellbores and the interpolated gravity data from the interpolation technique, a three-dimensional gravimetric model may be generated that represents reservoir gravity across a field of wellbores in the hydrocarbon reservoir. Because of a correlation between reservoir gravity and gas saturation, the three-dimensional gravimetric model may provide an indication of fluid saturation within the hydrocarbon reservoir. This process may be repeated over time to generate a time-lapse fluid saturation model that monitors fluid propagation in time and space in the hydrocarbon reservoir.

Some examples can offer techniques for efficiently generating three-dimensional fluid saturation models of a hydrocarbon reservoir. A system may involve avoiding inversion or geophysical analysis while generating three-dimensional models with high resolution. As discussed in detail below with respect to the figures, the time-lapse fluid saturation model may be used to monitor fluid propagation in time and space in the hydrocarbon reservoir such that an operator of a wellbore in the hydrocarbon reservoir can control hydrocarbon pumping or gas injection operations.

Illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
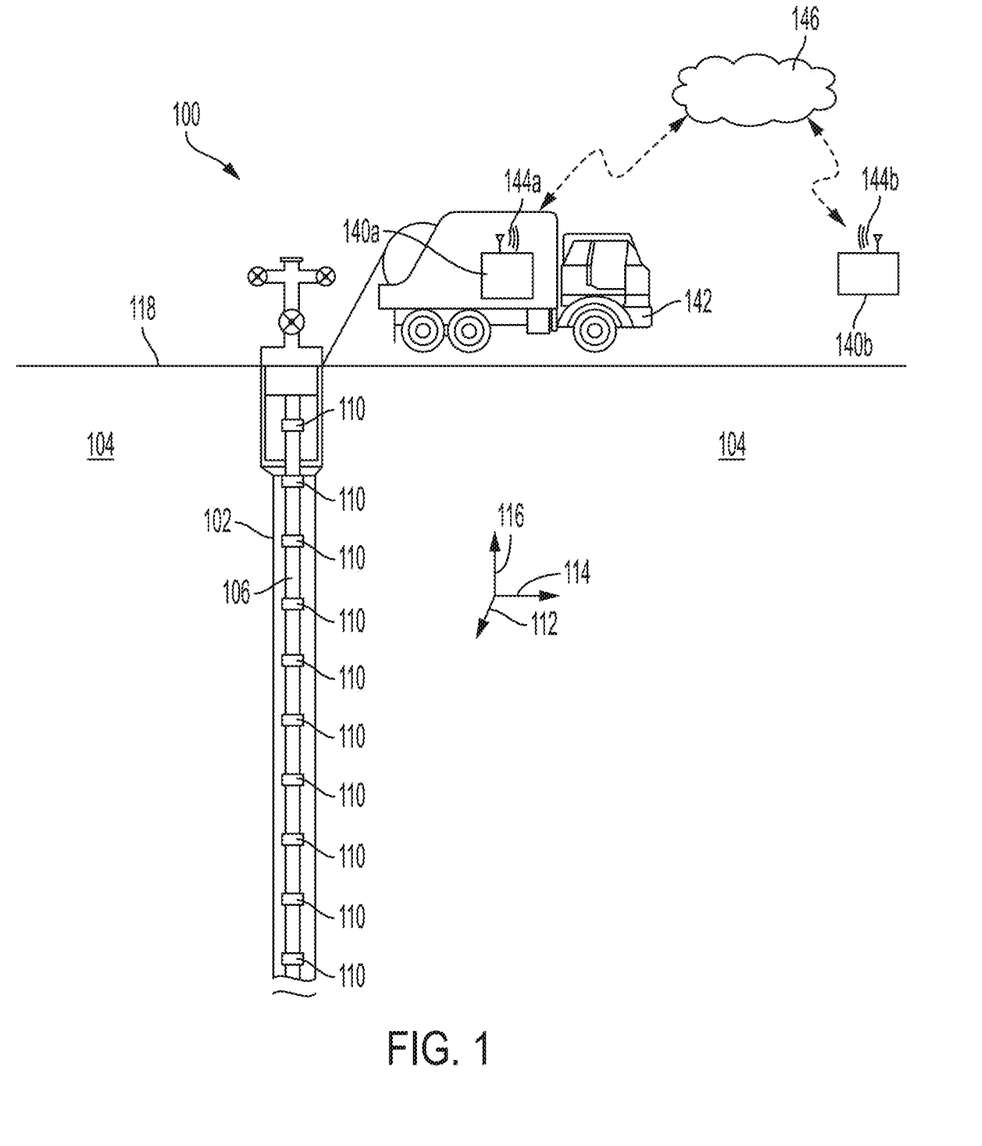
FIG. 1 is a cross-sectional view of an example of a well system according to some aspects.

FIG. 1 is a cross-sectional view of an example of a well system 100 that may employ one or more principles of the present disclosure. A wellbore 102 may be created by drilling into the formation 104. In an example, the formation 104 may represent a portion of a hydrocarbon reservoir, as discussed herein. Upon completion of the wellbore 102, the well system 100 may deploy production or injection tubing 106 into the wellbore 102. The tubing 106 may be used for producing hydrocarbon fluids and other fluids from the wellbore 102 when the wellbore 102 is a production well, or the tubing 106 may be used for injecting an inert gas into the wellbore 102 in a gas injection well.

Multiple gravity sensors 110 may be positioned along a length of the tubing 106 at regular or irregular intervals. The gravity sensors 110 may be any sensors capable of taking gravimetric readings. For example, the gravity sensors 110 may be any sensor that is capable of measuring an acceleration effect of the Earth's gravity at a point in the wellbore 102. In an example, the gravity sensors 110 may be accelerometers that include other sensors to remove linear accelerations from the gravimetric data. The gravity sensors 110 may be separated by between one foot and ten feet (i.e., 0.3 to three meters) along a length of the tubing 106. In other embodiments, the gravity sensors may also be separated by greater than ten feet or by less than one foot.

The gravity sensors 110 may read gravity data in three-dimensions. Accordingly, the gravity data of the area surrounding each gravity sensor 110 may include an x-component, a y-component, and a z-component (collectively, a "multicomponent gravity reading"), where an x-direction 112, a y-direction 114, and a z-direction 116 associated with the components are orthogonal. In an example, communication devices associated with the gravity sensors 110 may transmit signals to a surface 118 of the wellbore 102 indicating the multicomponent gravity readings of the gravity sensors 110. The signals transmitted to the surface may be acoustic signals, electromagnetic signals, mud-pulse telemetry signals, wireline signals, or any other types of signals capable of providing the multicomponent gravity readings to the surface 118 of the wellbore 102.

The gravity sensors 110 may respond to variations in the density surrounding the gravity sensors 110. Accordingly, when placed within the wellbore 102, the gravity sensors 110 are able to detect variations in the density of the formation 104 surrounding the wellbore 102. By monitoring the detected variations in the density of the formation surrounding the wellbore 102 over time, an operator is able to monitor fluid propagation in the area surrounding each of the gravity sensors 110.

Still referring to FIG. 1, the downhole tools may be in communication with a computing device 140a, which is illustrated by way of example at the surface 118 in FIG. 1. In an additional embodiment, the computing device 140a may be located elsewhere, such as downhole, or the computing device may be a distributed computing system including multiple, spatially separated computing components (e.g., 140a, 140b, downhole, or any combination thereof). Other equipment of the well system 100 described herein may also be in communication with the computing device 140a. In some embodiments, one or more processors used to control a production or injection operation of the well system 100 may be in communication with or otherwise controlled by the computing device 140a.

In FIG. 1, the computing device 140a is illustrated as being deployed in a work vehicle 142. However, the computing device 140a that receives data from the gravity sensors 110 may be permanently installed surface equipment of the well system 100. In other embodiments, the computing device 140a may be hand-held or remotely located from the well system 100. In some examples, the computing device 140a may process at least a portion of the data received and transmit the processed or unprocessed data to an additional computing device 140b via a wired or wireless network 146. The additional computing device 140b may be offsite, such as at a data-processing center. The additional computing device 140b may receive the data, process the data, execute computer program instructions to issue commands to control the operation of the well system 100, and communicate those commands to computing device 140a.

Further, the additional computing device 140b may receive additional gravity data from other gravity sensors positioned in additional wellbores within a same reservoir as the wellbore 102. The additional computing device 140b may generate a three-dimensional fluid saturation model of the reservoir by interpolating gravity data about space between the wellbores 102 that is not read or otherwise detected by gravity sensors within the wellbores 102. For example, the additional computing device 140b may apply a simple kriging interpolation method to the data from the gravity sensors to interpolate the additional gravity data.

When the three-dimensional fluid saturation model is generated by the additional computing device 140b at multiple time steps, a time-lapse, three-dimensional fluid saturation model may be generated by the additional computing device 140b. The time-lapse, three-dimensional fluid saturation model may indicate fluid propagation within the hydrocarbon reservoir in time and space such that an operator of the wellbore 102 in the hydrocarbon reservoir can control hydrocarbon pumping or gas injection operations. For example, if some of the gravity sensors 110 in a particular wellbore 102 show no change in fluid saturation in an adjacent productive reservoir region over the time, this region may be exposed to an additional well stimulation to ensure that the region starts or restarts hydrocarbon production. Also, if inferred 3D fluid saturation model derived from interpolated gravity measurements shows bypassed hydrocarbon regions in the reservoir, one or more additional wells may be drilled in these bypassed regions to extract trapped hydrocarbons that are not otherwise available for production from the reservoir.

The computing devices 140a-b may be positioned belowground, aboveground, onsite, in a vehicle, offsite, etc. The computing devices 140a-b may include a processor interfaced with other hardware via a bus. A memory, which may include any suitable tangible (and non-transitory) computer-readable medium, such as RAM, ROM, EEPROM, or the like, can embody program components that configure operation of the computing devices 140a-b. In some aspects, the computing devices 140a-b may include input/output interface components (e.g., a display, printer, keyboard, touch-sensitive surface, and mouse) and additional storage.

The computing devices 140a-b may include surface communication devices 144a-b. The surface communication devices 144a-b may represent one or more of any components that facilitate a network connection. In the example shown in FIG. 1, the surface communication devices 144a-b are wireless and may include wireless interfaces such as IEEE 802.11, Bluetooth, or radio interfaces for accessing cellular telephone networks (e.g., RF stage/antenna for accessing a CDMA, GSM, UMTS, or other mobile communications network). In some examples, the surface communication devices 144a-b may use acoustic waves, surface waves, vibrations, optical waves, or induction (e.g., magnetic induction) for engaging in wireless communications. In other examples, the surface communication devices 144a-b may be wired and can include interfaces such as Ethernet, USB, IEEE 1394, or a fiber optic interface. The computing devices 140a-b can receive wired or wireless communications from one another and perform one or more tasks based on the communications.

While FIG. 1 depicts the well system 100 where the computing devices 140a-b receive data from the gravity sensors 110 for use in generating three-dimensional fluid saturation models, other systems may also be controlled using the computing devices 140a-b. For example, the computing devices 140a-b may receive performance data related to hydrocarbon production systems, wellbore casing and cementing systems, wellbore fracturing systems, wellbore maintenance programs, or any other wellbore technologies. The computing devices 140a-b may receive the performance data, execute computer program instructions to issue commands to control the operation of the wellbore technology, and apply those commands to equipment of the wellbore technology. In some aspects, the performance data may be considered "real-time" data as the performance data is collected and transmitted to the computing devices 140a-b as the wellbore equipment is operated.

Further, while FIG. 1 depicts the wellbore 102 in a vertical orientation, the techniques described herein may also be used in horizontal wellbore systems. As used herein, the horizontal wellbore system may be a wellbore with a trajectory other than vertical (e.g., horizontal, inclined, etc.). In one or more examples, the gravity sensors 110 may be permanently installed within the wellbores 102 (e.g., within a casing of the wellbore 102), or the gravity sensors 110 may be removably installed within the wellbores 102 (e.g., along the tubing 106, as illustrated).

Figure 2:
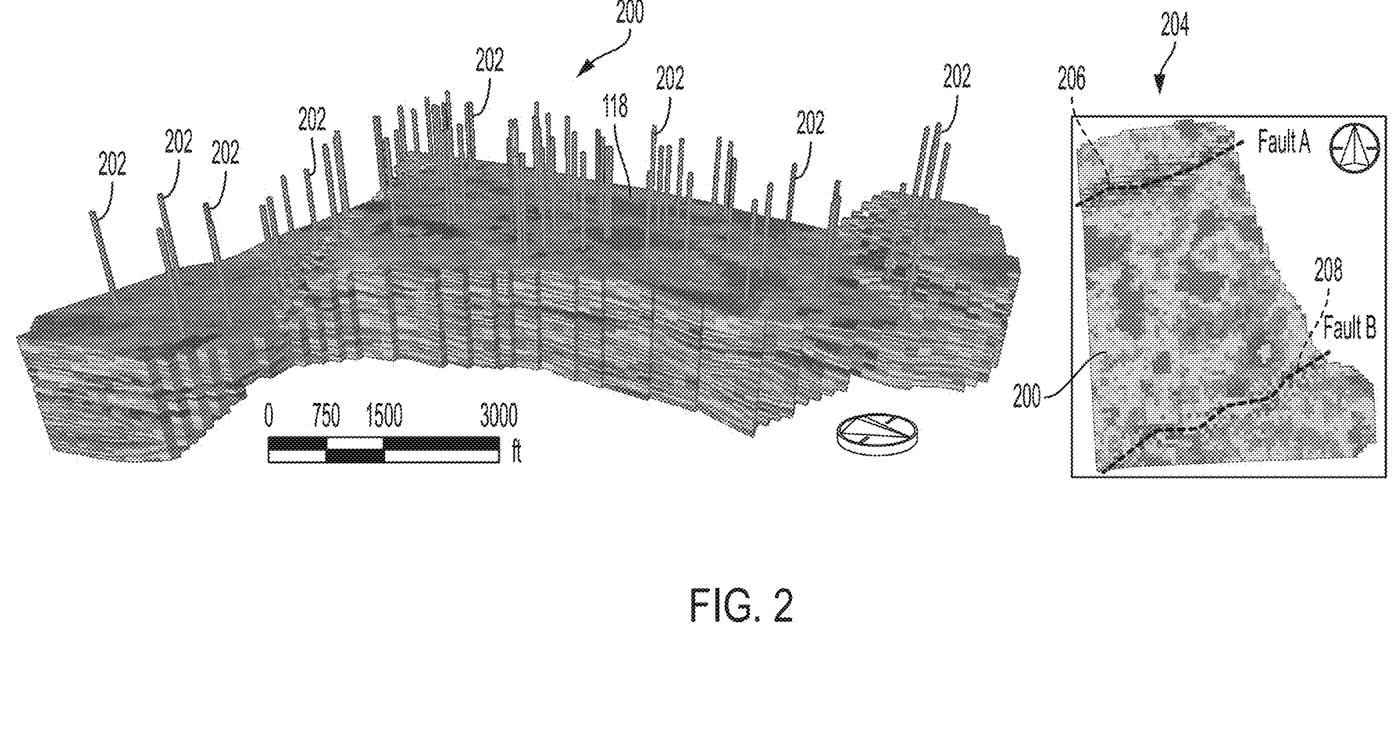
FIG. 2 is an example of a representation of a hydrocarbon reservoir providing an indication of wellbore locations according to some aspects.

FIG. 2 is an example of a representation of a hydrocarbon reservoir 200 providing an indication of locations 202 of the wellbores 102. The hydrocarbon reservoir 200 may include multiple wellbores 102 spread over a surface 118 of the hydrocarbon reservoir 200. While the wellbores 102 may be densely positioned along the surface 118 of the hydrocarbon reservoir 200, the gravity sensors 110 positioned within the wellbores 102 may have a limited range for reading into the formation 104 of the hydrocarbon reservoir 200 surrounding the wellbores 102. For example, the gravity sensors 110 may detect gravity data that is local (e.g., within 50 feet) to the position of the gravity sensors 110 within the wellbore 102, while the locations 202 of the wellbores 102 may be several hundred feet or meters apart. This may leave a significant amount of gravity data of the hydrocarbon reservoir 200 that is not directly measured by the gravity sensors 110.

In an example, the wellbores 102 positioned at the locations 202 may represent injection and production wells. For example, some of the wellbores 102 may be producing hydrocarbons from the hydrocarbon reservoir 200 while other wellbores 102 may be injecting inert gas (e.g., carbon dioxide) into the hydrocarbon reservoir 200 to maintain reservoir pressure and improve oil displacement in the formation 104 surrounding the injection wells. In one or more examples, the density difference between the hydrocarbons within the hydrocarbon reservoir 200 and the inert gas injected into the hydrocarbon reservoir 200 may provide a greater indication of fluid propagation in the time-lapse, three-dimensional fluid saturation model due to a large contrast in gravity measurements between the hydrocarbons and the inert gas. For example, the lighter inert gases are easily observable in the time-lapse, three-dimensional fluid saturation model as the inert gases replace the heavier hydrocarbons that are produced by the production wells.

Also included in FIG. 2 is an overhead view 204 of the hydrocarbon reservoir 200. The overhead view includes an indication of a fault 206 and a fault 208 within the hydrocarbon reservoir 200. The faults 206 and 208 may be observable in the time-lapse, three-dimensional fluid saturation models. For example, the time-lapse, three-dimensional fluid saturation models may show a lack of fluid movement within the hydrocarbon reservoir 200 across locations of the faults 206 and 208. Other impermeable layers of the formation 104, or layers of the formation 104 with limited permeability, within the reservoir may be depicted in the time-lapse, three-dimensional fluid saturation models in a similar manner (e.g., by a lack of movement of fluid across locations of the impermeable layers or limited permeability layers).

Figure 3:
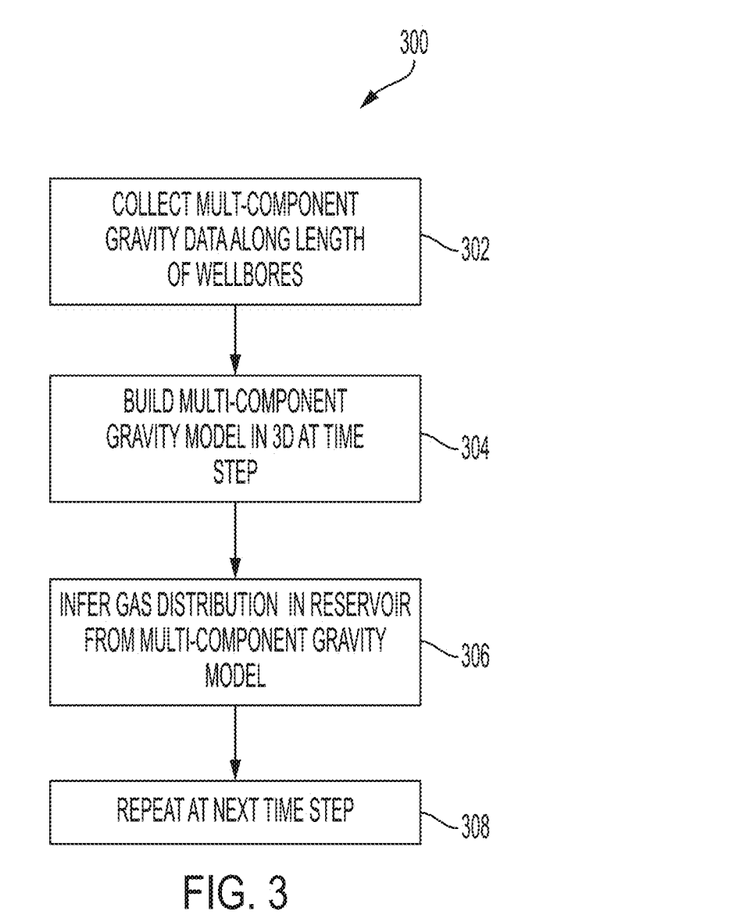
FIG. 3 is an example of a process for building a multicomponent gravity model over time according to some aspects.

FIG. 3 is an example of a process 300 for building a multicomponent gravity model over time (e.g., a time-lapse, three-dimensional fluid saturation model). One or more computing devices (e.g., the computing devices 140a-b) implement operations depicted in FIG. 3 by executing suitable program code. For illustrative purposes, the process 300 is described with reference to certain examples depicted in the figures. Other implementations, however, are possible.

The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 300 presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel.

At block 302, the process 300 involves collecting multicomponent gravity data along a length of each of the wellbores 102, which include the gravity sensors 110, that are within the hydrocarbon reservoir 200. As discussed above, gravity sensors 110 positioned along the tubing 106 within the wellbores 102 may provide multicomponent gravity readings of the formation 104 surrounding the wellbores 102 to the computing devices 140a-b. The gravity sensors 110 may be positioned at regular or irregular intervals within the wellbores 102. In an example, the gravity sensors 110 may be positioned between 1 and 10 feet apart from one another.

At block 304, the process 300 involves building a multicomponent gravity model in three-dimensions at an initial time step. For example, the multicomponent gravity data collected from the wellbores 102 is used with a spatial interpolation technique to generate a three-dimensional fluid saturation model of the hydrocarbon reservoir 200 at a specified time step.

The spatial interpolation technique may be a simple kriging interpolation applied to the multicomponent gravity data from the wellbores 102 to interpolate gravity data between the wellbores 102 of the hydrocarbon reservoir 200. Other interpolation techniques may also be used such as an inverse distance method or deep neural network algorithms. Using the simple kriging interpolation technique, gravity measurements can be used to monitor gas propagation in the hydrocarbon reservoir 200 in time and space. Simple kriging may be expressed with the following equation:

$$z*(r) - m(r) = \sum_{\alpha=1}^{N} \lambda_\alpha \cdot [z(r_\alpha) - m(r_\alpha)] \quad \text{(Equation 1)}$$

where $z*(r)$ is an estimated value at an unsampled location r, and $m(r)$ is a prior mean value at the unsampled location r. $z(r)$ is an existing data value, $\lambda_\alpha$ is a weight that is applied to an $\alpha$-th data point ($\alpha=1, \ldots, N$). In an example, no trend data is applied to the equation. Accordingly, all prior mean values can be set as $m(r)=m(r_\alpha)=\overline{m}$.

Using the simple kriging technique, weights may be calculated as functions of distance. For example, the weights, which may minimize a variance of an estimated value, may be written with the following equation:

$$\sum_{\alpha=1}^{N} \lambda_\beta C(r_\beta - r_\alpha) = C(r - r_\alpha), (\alpha = 1, \ldots, N) \quad \text{(Equation 2)}$$

where C denotes a covariance. Applying the multicomponent gravity data to this simple kriging technique, the multicomponent gravity model (e.g., the three-dimensional fluid saturation model) is generated for a time step for the hydrocarbon reservoir 200.

At block 306, the process 300 involves inferring gas distribution in the hydrocarbon reservoir 200 from the multicomponent gravity model. As mentioned above, the density of the inert gas injected into the hydrocarbon reservoir 200 may be much less than a density of the hydrocarbons within the hydrocarbon reservoir 200. Accordingly, the multicomponent gravity model may identify contrasts between the inert gas and the hydrocarbons within the hydrocarbon reservoir 200. Using this contrast, the location of the inert gas may be inferred.

At block 308, the process 300 involves repeating the process 300 at a subsequent time step to generate a time-lapse, multicomponent gravity model (e.g., the time-lapse, three-dimensional fluid saturation model). Further, block 308 may be repeated over an extended number of time steps to add robustness to the time-lapse, multicomponent gravity model.

In an example, the time-lapse, multicomponent gravity model may be used to monitor fluid propagation within the hydrocarbon reservoir 200 over time. For example, the time-lapse, multicomponent gravity model may show locations of the injected inert gas as it travels within the hydrocarbon reservoir 200. By monitoring the fluid propagation, an operator of one or more wellbores 102 within the hydrocarbon reservoir 200 may control wellbore operations at the wellbores 102. For example, the operator may increase gas injection in a wellbore 102 located in an area where fluid propagation is very active (e.g., where the gas injection may have a significant impact on hydrocarbon production). Alternatively, the operator may decrease gas injection in a wellbore 102 located in an area where fluid propagation is not very active (e.g., where the gas injection may have a minimal impact on hydrocarbon production). Other changes to the wellbore operations may also be performed in response to the indication of fluid propagation within the hydrocarbon reservoir 200.

Figure 4:
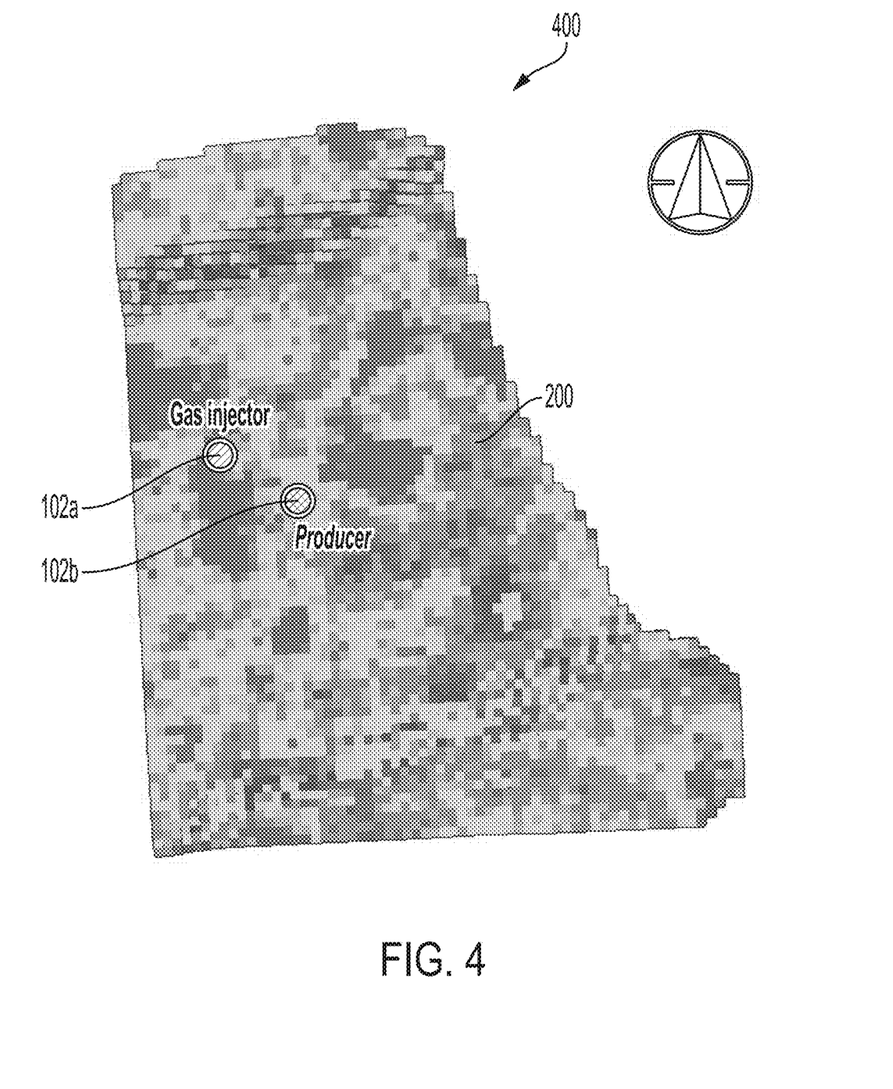
FIG. 4 is an example of an overhead view of the hydrocarbon reservoir indicating a location of two wellbores according to some aspects.

FIG. 4 is an example of an overhead view 400 of the hydrocarbon reservoir 200 indicating a location of two wellbores 102a and 102b. As illustrated, the wellbore 102a may be a gas injection wellbore, and the wellbore 102b may be a producer wellbore. Multicomponent gravity readings from multiple time steps from the wellbore 102a are depicted and described below with respect to FIG. 5. Further, multicomponent gravity readings from multiple time steps from the wellbore 102b are depicted and described below with respect to FIG. 6. While only two wellbores 102a and 102b are illustrated in FIG. 4, the hydrocarbon reservoir 200 may include dozens of additional wellbores 102 with the gravity sensors 110 positioned to take gravity readings of the hydrocarbon reservoir 200 from within the additional wellbores 102. The additional wellbores 102 may provide additional data points to increase robustness of a three-dimensional fluid saturation model.

Figure 5:
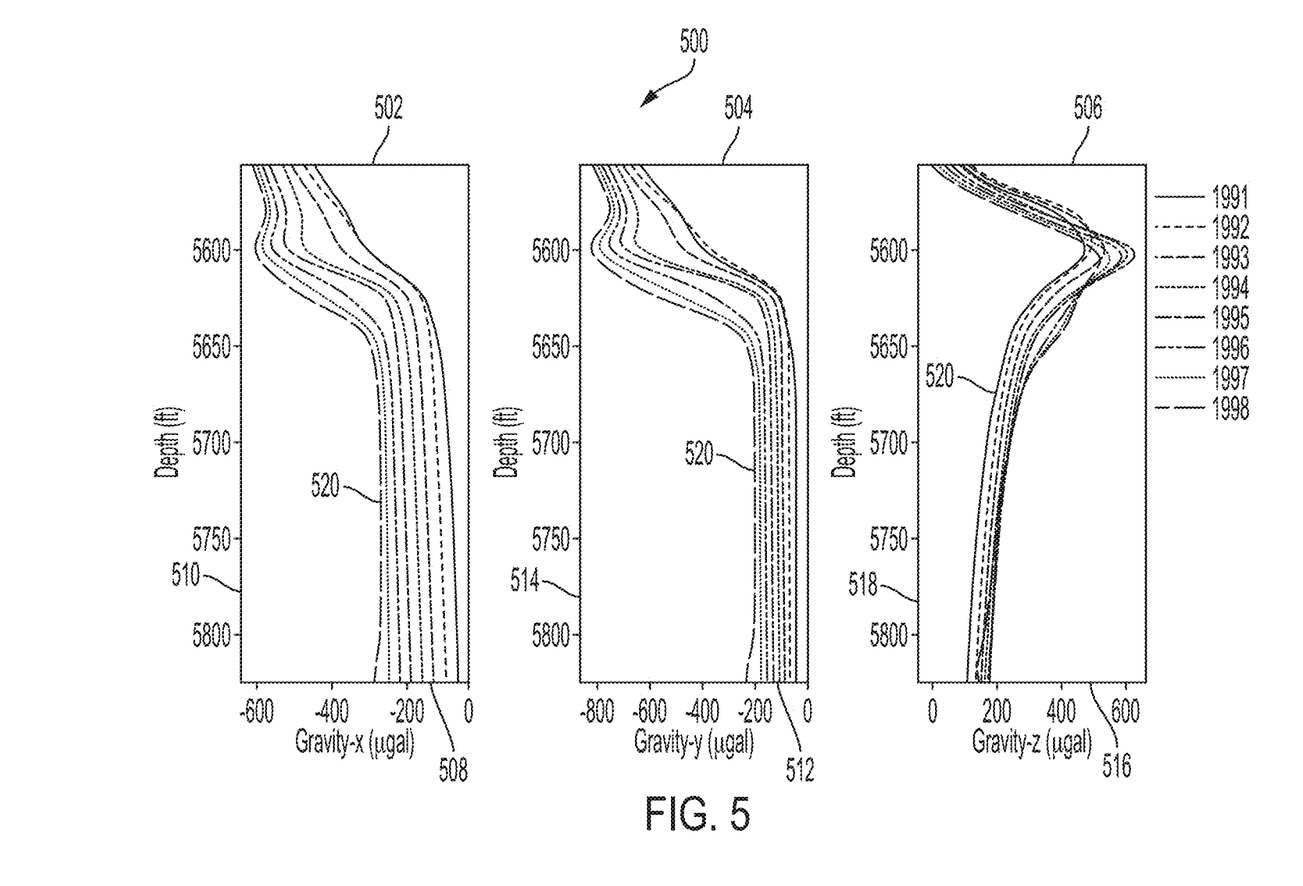
FIG. 5 is an example of time-lapse multicomponent borehole gravity data at a gas injector identified in FIG. 4 according to some aspects.

FIG. 5 is an example of time-lapse multicomponent borehole gravity readings 500 at the wellbore 102a (e.g., a gas injector) identified in the overhead view 400 of the hydrocarbon reservoir 200. A graph 502 represents gravity readings with an x-component that are collected by the gravity sensors 110 within the wellbore 102a over 8 years. An abscissa 508 represents the gravity reading in microgals in the x-direction 112, and an ordinate 510 represents a depth in feet within the wellbore 102a. A graph 504 represents gravity readings with a y-component that are collected by the gravity sensors 110 within the wellbore 102a over 8 years. An abscissa 512 represents the gravity reading in microgals in the y-direction 114, and an ordinate 514 represents a depth in feet within the wellbore 102a. A graph 506 represents gravity readings with a z-component that are collected by the gravity sensors 110 within the wellbore 102a over 8 years. An abscissa 516 represents the gravity reading in microgals in the z-direction 116, and an ordinate 518 represents a depth in feet within the wellbore 102a.

Each of the lines 520 in the graphs 502, 504, and 506 represent gravity data collected at different time steps. As illustrated, the time step for data collection is 1 year. Larger or smaller time steps may also be used. For example, the time step for data collection may be 1 month, 1 week, or 1 day. Collecting the multicomponent gravity readings at multiple time steps enables generation of the time-lapse, three-dimensional fluid saturation model such that a user is able to observe fluid propagation within the hydrocarbon reservoir 200 over time.

In an example, a steady change in gravity at each depth over time may represent a porous area of the hydrocarbon reservoir 200 where fluid propagation within the reservoir may occur. In particular, the graphs 502 and 504 generally indicate that fluids are steadily moving through the reservoir in the x and y-directions 112 and 114. In the graph 506, the gravity readings at different time steps cross each other at various depths within the wellbore 102a. This may indicate the presence of a large, impermeable layer in the z-direction 116.

Figure 6:
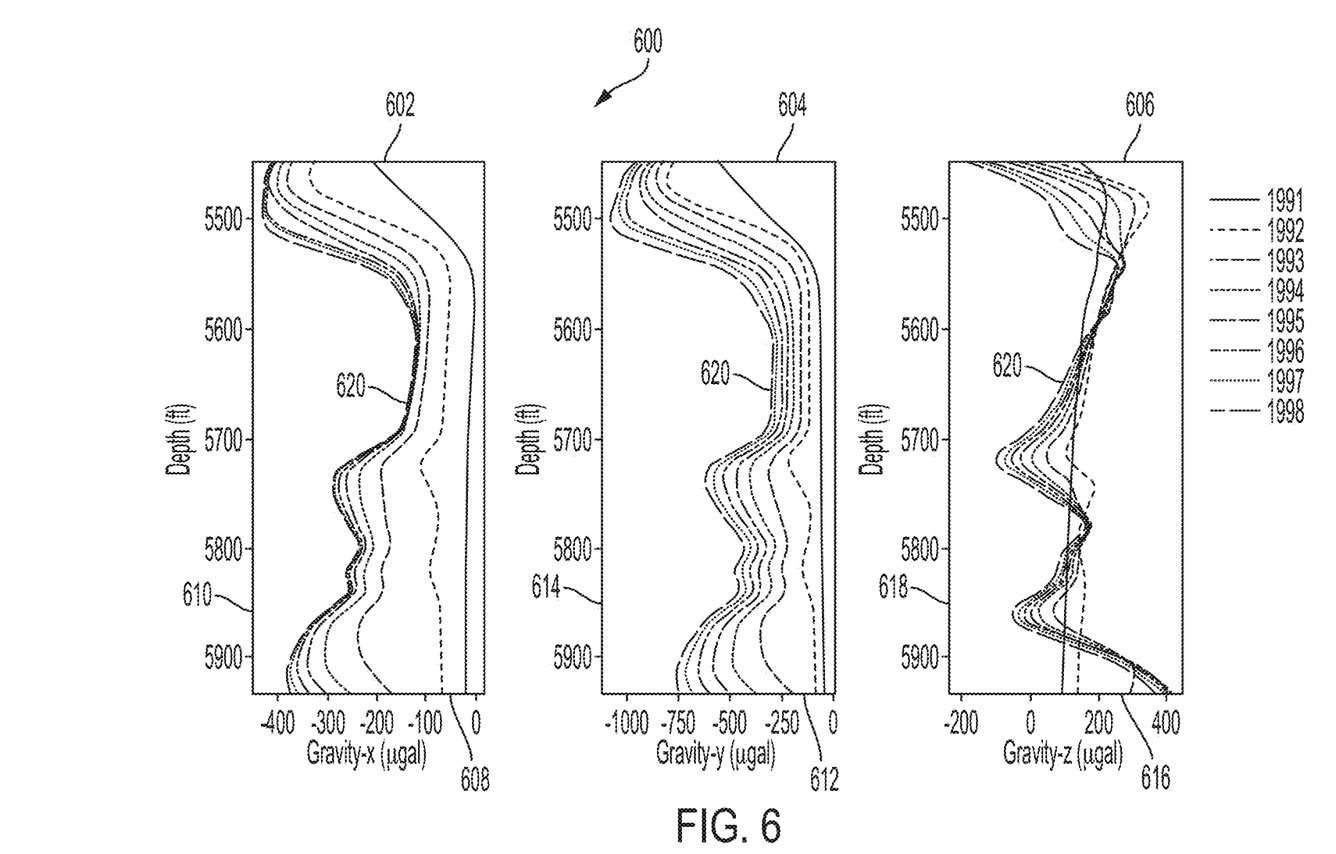
FIG. 6 is an example of time-lapse multicomponent borehole gravity data at a producer identified in FIG. 4 according to some aspects.

FIG. 6 is an example of time-lapse multicomponent borehole gravity readings 600 at the wellbore 102b (e.g., a producer) identified in the overhead view 400 of the hydrocarbon reservoir 200. A graph 602 represents gravity readings with an x-component that are collected by the gravity sensors 110 within the wellbore 102b over 8 years. An abscissa 608 represents the gravity reading in microgals in the x-direction 112, and an ordinate 610 represents a depth in feet within the wellbore 102b. A graph 604 represents gravity readings with a y-component that are collected by the gravity sensors 110 within the wellbore 102b over 8 years. An abscissa 612 represents the gravity reading in microgals in the y-direction 114, and an ordinate 614 represents a depth in feet within the wellbore 102b. A graph 606 represents gravity readings with a z-component that are collected by the gravity sensors 110 within the wellbore 102b over 8 years. An abscissa 616 represents the gravity reading in microgals in the z-direction 116, and an ordinate 618 represents a depth in feet within the wellbore 102b.

Each of the lines 620 in the graphs 602, 604, and 606 represent gravity data collected at different time steps. As illustrated, the time step for data collection is 1 year. Larger or smaller time steps may also be used. Collecting the multicomponent gravity readings at multiple time steps enables generation of the time-lapse, three-dimensional fluid saturation model such that a user is able to observe fluid propagation within the hydrocarbon reservoir 200 over time.

In an example, a steady change in gravity at each depth over time may represent a porous area of the hydrocarbon reservoir 200 where fluid propagation within the reservoir may occur. In particular, the graphs 602 and 604 generally indicate that fluids are steadily moving through the reservoir in the x-direction 112 and the y-direction 114. The oil replacement rate by the gas flow may slow down at later time steps resulting in a smaller changes over time. In the graph 606, minimal changes to the gravity readings at different time steps (e.g., especially later time steps) at various depths within the wellbore 102*a* may indicate the presence of a number of large, impermeable layers in the z-direction 116.

Figure 7:
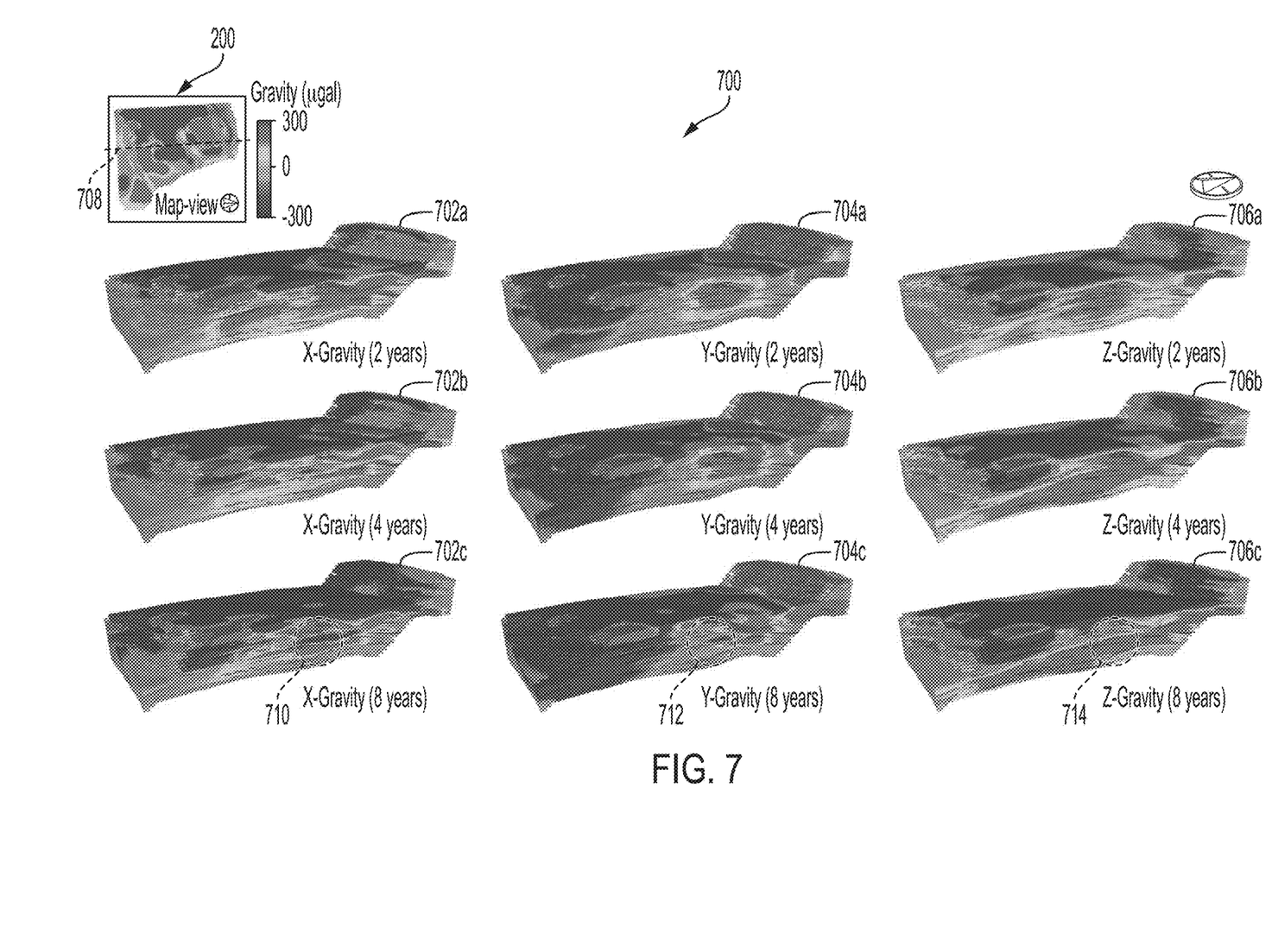
FIG. 7 is an example of a section view of interpolated time-lapse borehole gravity models for the hydrocarbon reservoir of FIG. 4 according to some aspects.

FIG. 7 is an example of a section view 700 of an interpolated time-lapse, multicomponent borehole gravity model for the hydrocarbon reservoir 200. As discussed above, the multicomponent gravity data collected for each of the wellbores 102 within the hydrocarbon reservoir 200 may be interpolated (e.g., using a simple kriging technique or other suitable interpolation technique) to estimate gravity data of portions of the hydrocarbon reservoir 200 not directly measured by the gravity sensors 110. As illustrated, vertical sections of an x-component 702, a y-component 704, and a z-component 706 of the interpolated time-lapse, multicomponent borehole gravity model (i.e., the time-lapse, multicomponent fluid saturation model) are depicted along a line 708 of the hydrocarbon reservoir 200.

Further, the x-component 702*a* represents the multicomponent borehole gravity model at a 2-year time step in the x-direction 112, the x-component 702*b* represents the multicomponent borehole gravity model at a 4-year time step in the x-direction 112, and the x-component 702*c* represents the multicomponent borehole gravity model at an 8-year time step in the x-direction 112. Similarly, the y-component 704*a* represents the multicomponent borehole gravity model at a 2-year time step in the y-direction 114, the y-component 704*b* represents the multicomponent borehole gravity model at a 4-year time step in the y-direction 114, and the y-component 704*c* represents the multicomponent borehole gravity model at an 8-year time step in the y-direction 114. Additionally, the z-component 706*a* represents the multicomponent borehole gravity model at a 2-year time step in the z-direction 116, the z-component 706*b* represents the multicomponent borehole gravity model at a 4-year time step in the z-direction 116, and the z-component 706*c* represents the multicomponent borehole gravity model at an 8-year time step in the z-direction 116.

Observing the x-component 702, the y-component 704, and the z-component 706 over time may provide a user with the ability to infer a range of gas penetration (e.g., from the injector wells within the hydrocarbon reservoir 200) or other fluid saturation within the hydrocarbon reservoir 200. The time-lapse, multicomponent borehole gravity model may enable direct observation of a vertical variation in a gravity response by the hydrocarbon reservoir 200, as in areas 710, 712, and 714 of the x-component 702*c*, the y-component 704*c*, and the z-component 706*c*, respectively. Further, the time-lapse, multicomponent borehole gravity model may provide an indication of structural barriers within the hydrocarbon reservoir 200 (e.g., impermeable formations, faults, etc.).

In general, a decrease in the gravity values may indicate that heavier reservoir fluid, such as oil, is displaced by injected lighter fluid, such as an inert gas. Using the time-lapse, multicomponent borehole gravity model, a user can observe fluid propagation within the hydrocarbon reservoir 200. Having three components of the gravity data may enhance understanding of the inert gas propagation in time as highlighted by circles 710, 712 and 714. All three components indicate presence of the impermeable layer in the middle of the formation, which may be seen the best from the interpolated x-component gravity 702*c*. Further, operators of the wellbores 102 may adjust wellbore operations based on the observed propagation. For example, production or injection may increase or decrease at the wellbores 102 based on the observed fluid propagation. In one or more examples, the computing devices 140*a-b* may automatically adjust operations associated with hydrocarbon production or gas injection at the wellbores 102. For example, the computing devices 140*a-b* may control production pumps to increase or decrease production pumping rates based on the fluid flow within the hydrocarbon reservoir 200. Similarly, the computing devices 140*a-b* may control injection pumps to increase or decrease injection pumping rates based on the fluid flow within the hydrocarbon reservoir 200.

Figure 8:
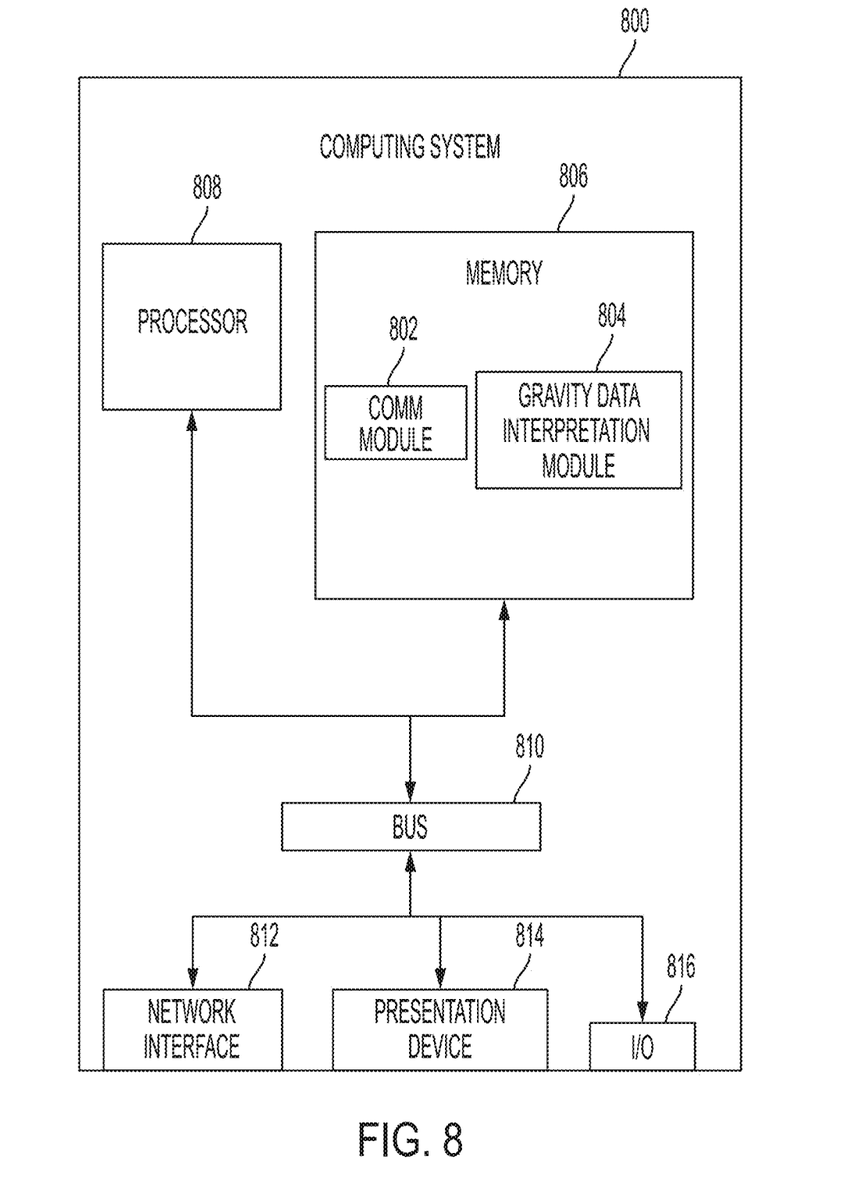
FIG. 8 is an example of a computing system for implementing certain embodiments of the present disclosure according to some aspects.

Any suitable computing system or group of computing systems can be used for performing the operations described herein. For example, FIG. 8 depicts an example of a computing system 800. The computing system 800 implements a communication module 802 and a gravity data interpretation module 804 stored on a memory device 806. In an embodiment, the communication module 802 is implemented by the computing system 800 to provide communication between devices. For example, the computing system 800 may communicate with other computing systems 800 and the computing system 800 may communicate with downhole devices, such as the gravity sensors described herein. Further, the gravity data interpretation module 804 is implemented by the computing system 800 to perform the interpretation techniques described herein on multicomponent gravity readings received from the gravity sensors 110. In an embodiment, a computing system 800 having devices similar to those depicted in FIG. 8 (e.g., a processor, a memory, etc.) combines the one or more operations and data stores that may be operated as separate subsystems.

The depicted example of the computing system 800 includes a processor 808 communicatively coupled to one or more memory devices 806. The processor 808 executes computer-executable program code stored in a memory device 806, accesses information stored in the memory device 806, or both. Examples of the processor 808 include a microprocessor, an application-specific integrated circuit ("ASIC"), a field-programmable gate array ("FPGA"), or any other suitable processing device. The processor 808 can include any number of processing devices, including a single processing device.

The memory device 806 includes any suitable non-transitory computer-readable medium for storing program code (e.g., the communications module 802 and the gravity data interpretation module 804), program data (e.g., data associated with the communications module 802 and the gravity data interpretation module 804), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, ActionScript, Fortran, or any other programming language. In various examples, the memory device 806 can be volatile memory, non-volatile memory, or a combination thereof.

The computing system 800 executes program code that configures the processor 808 to perform one or more of the operations described herein. Examples of the program code include, in various embodiments, the communications module 802, the gravity data interpretation module 804, or any other suitable systems or subsystems that perform one or more operations described herein. The program code may be resident in the memory device 806 or any suitable computer-readable medium and may be executed by the processor 808 or any other suitable processor.

The processor 808 is an integrated circuit device that can execute the program code. The program code can be used for executing an operating system, an application system or subsystem (e.g., the communications module 802 and the gravity data interpretation module 804), wellbore operation tools (e.g., injection pumps, production pumps, etc.), or a combination thereof. When executed by the processor 808, the instructions cause the processor 808 to perform operations of the program code. When being executed by the processor 808, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 806 store the program data that includes one or more datasets and models described herein. Examples of these datasets include gravity sensor data, three-dimensional model data, etc. In some embodiments, one or more of data sets, models, and functions are stored in the same memory device (e.g., one of the memory devices 806). In additional or alternative embodiments, one or more of the programs, data sets, models, and functions described herein are stored in different memory devices 806 accessible via a data network. One or more buses 810 are also included in the computing system 800. The buses 810 communicatively couple one or more components of a respective one of the computing system 800.

In some embodiments, the computing system 800 also includes a network interface device 812. The network interface device 812 includes any device or group of devices suitable for establishing a wired or wireless data connection to one or more data networks. Non-limiting examples of the network interface device 812 include an Ethernet network adapter, a modem, and/or the like. The computing system 800 is able to communicate with one or more other computing devices via a data network using the network interface device 812.

The computing system 800 may also include a number of external or internal devices, a presentation device 814, or other input or output devices. For example, the computing system 800 is shown with one or more input/output ("I/O") interfaces 816. An I/O interface 816 can receive input from input devices or provide output to output devices. Non-limiting examples of input devices include a touchscreen, a mouse, a keyboard, a microphone, a separate mobile computing device, etc. A presentation device 814 can include any device or group of devices suitable for providing visual, auditory, or other suitable sensory output. Non-limiting examples of the presentation device 814 include a touchscreen, a monitor, a speaker, a separate mobile computing device, etc.

Although devices that provide input or output to the computing system 800 through the I/O interface 816 may be local to the computing device that executes the program code, other implementations are possible. For instance, in some embodiments, one or more of input devices and output devices (e.g., including the presentation device 814) can include a remote client-computing device that communicates with the computing system 800 via the network interface device 812 using one or more data networks.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

In some aspects, systems, devices, and methods for generating time-lapse, three-dimensional fluid saturation models are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a method comprising: collecting, from a first set of gravity sensors, a first set of multicomponent borehole gravity data at a first time step along a first length of a first wellbore; collecting, from a second set of gravity sensors, a second set of multicomponent borehole gravity data at the first time step along a second length of a second wellbore; interpolating a third set of multicomponent borehole gravity data at the first time step in an area between the first wellbore and the second wellbore using the first set of multicomponent borehole gravity data and the second set of multicomponent borehole gravity data; determining a first fluid saturation in a reservoir containing the first wellbore and the second wellbore using the first set, the second set, and the third set of multicomponent borehole gravity data; determining a fluid saturation change in the reservoir between the first time step and a second time step by comparing the first fluid saturation in the reservoir with a second fluid saturation in the reservoir for the second time step; and controlling wellbore production operations or wellbore injection operations at the first wellbore based on the fluid saturation change.

Example 2 is the method of example 1, wherein interpolating the third set of multicomponent borehole gravity data comprises applying a simple kriging interpolation to the first set of multicomponent borehole gravity data and the second set of multicomponent borehole gravity data.

Example 3 is the method of examples 1-2, further comprising: collecting a fourth set of multicomponent borehole gravity data at the second time step along the first length of the first wellbore; collecting a fifth set of multicomponent borehole gravity data at the second time step along the second length of the second wellbore; interpolating a sixth set of multicomponent borehole gravity data at the second time step in the area between the first wellbore and the second wellbore using the fourth set of multicomponent borehole gravity data and the fifth set of multicomponent borehole gravity data; and determining the second fluid saturation at the second time step in the reservoir containing the first wellbore and the second wellbore using the fourth, fifth, and sixth sets of multicomponent borehole gravity data.

Example 4 is the method of examples 1-3, wherein determining the first fluid saturation in the reservoir comprises generating a multicomponent, three-dimensional fluid saturation model.

Example 5 is the method of examples 1-4, further comprising: generating a time-lapse, three-dimensional fluid saturation model indicating the fluid saturation change in the reservoir over time.

Example 6 is the method of examples 1-5, wherein the first and second sets of multicomponent borehole gravity data comprise x-components, y-components, and z-components.

Example 7 is the method of examples 1-6, wherein the second time step is at least one month after the first time step.

Example 8 is the method of examples 1-7, wherein the first wellbore comprises a gas injection wellbore, and the second wellbore comprises a production wellbore.

Example 9 is the method of examples 1-8, further comprising: identifying structural barriers in the reservoir using the fluid saturation change between the first time step and the second time step.

Example 10 is a well system comprising: a set of gravity sensors positionable within a first wellbore; a first communication device positionable to transmit a first set of multicomponent borehole gravity data from the set of gravity sensors to a surface of the first wellbore; and a computing device in communication with the first communication device, the computing device comprising: a processor; and a non-transitory computer-readable medium that includes instructions that are executable by the processor to perform operations comprising: receiving, from the first communication device, the first set of multicomponent borehole gravity data at a first time step along a first length of the first wellbore; receiving, from a second communication device of a second wellbore, a second set of multicomponent borehole gravity data at the first time step along a second length of the second wellbore; interpolating a third set of multicomponent borehole gravity data at the first time step in an area between the first wellbore and the second wellbore using the first set of multicomponent borehole gravity data and the second set of multicomponent borehole gravity data; determining a first fluid saturation in a reservoir containing the first wellbore and the second wellbore based on the first set, the second set, and the third set; and determining a fluid saturation change in the reservoir between the first time step and a second time step by comparing the first fluid saturation in the reservoir with a second fluid saturation in the reservoir for the second time step.

Example 11 is the well system of example 10, wherein the set of gravity sensors are positionable at regular intervals along the first length of the first wellbore.

Example 12 is the well system of examples 10-11, wherein the first wellbore comprises a gas injection wellbore, and the second wellbore comprises a production wellbore.

Example 13 is the well system of examples 10-12, wherein the set of gravity sensors are removably positionable along a length of tubing within the first wellbore.

Example 14 is the well system of examples 10-13, wherein the second wellbore is at least 100 feet from the first wellbore.

Example 15 is the well system of examples 10-14, wherein the first wellbore comprises a horizontal wellbore.

Example 16 is a non-transitory computer-readable medium that includes instructions that are executed by a processing device to perform operations, the operations comprising: collecting, from a first set of gravity sensors, a first set of multicomponent borehole gravity data at a first time step along a first length of a first wellbore; collecting, from a second set of gravity sensors, a second set of multicomponent borehole gravity data at the first time step along a second length of a second wellbore; interpolating a third set of multicomponent borehole gravity data at the first time step in an area between the first wellbore and the second wellbore using a simple kriging interpolation of the first set of multicomponent borehole gravity data and the second set of multicomponent borehole gravity data; determining a first fluid saturation in a reservoir containing the first wellbore and the second wellbore based on the first set, the second set, and the third set; and determining a fluid saturation change in the reservoir between the first time step and a second time step by comparing the first fluid saturation in the reservoir with a second fluid saturation in the reservoir determined for second time step.

Example 17 is the non-transitory computer-readable medium of example 16, the operations further comprising: collecting a fourth set of multicomponent borehole gravity data at the second time step along the first length of the first wellbore; collecting a fifth set of multicomponent borehole gravity data at the second time step along the second length of the second wellbore; interpolating a sixth set of multicomponent borehole gravity data at the second time step in the area between the first wellbore and the second wellbore using the fourth set of multicomponent borehole gravity data and the fifth set of multicomponent borehole gravity data; and determining the second fluid saturation at the second time step in the reservoir containing the first wellbore and the second wellbore using the fourth, fifth, and sixth sets of multicomponent borehole gravity data.

Example 18 is the non-transitory computer-readable medium of examples 16-17, wherein the operation of determining the first fluid saturation comprises generating a multicomponent, three-dimensional fluid saturation model.

Example 19 is the non-transitory computer-readable medium of examples 16-18, wherein the operation of determining the fluid saturation change comprises generating a time-lapse fluid saturation model.

Example 20 is the non-transitory computer-readable medium of examples 16-19, the operations further comprising: identifying structural barriers in the reservoir using the fluid saturation change between the first time step and the second time step.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   collecting, from a first set of gravity sensors, a first set of multicomponent borehole gravity data at a first time step along a first length of a first wellbore;
   collecting, from a second set of gravity sensors, a second set of multicomponent borehole gravity data at the first time step along a second length of a second wellbore;
   interpolating a third set of multicomponent borehole gravity data at the first time step in an area between the first wellbore and the second wellbore using the first set of multicomponent borehole gravity data and the second set of multicomponent borehole gravity data, wherein the area between the first wellbore and the second wellbore is at least partially out of a first range of the first set of gravity sensors and a second range of the second set of gravity sensors;
   generating a three-dimensional fluid saturation model of a reservoir at the first time step, wherein the reservoir contains the first wellbore, the second wellbore, and the area between the first wellbore and the second wellbore, and wherein the three-dimensional fluid saturation model is generated using the first set, the second set, and the third set of multicomponent borehole gravity data;
   determining, based on the three-dimensional fluid saturation model, a first fluid saturation in the reservoir;
   determining a fluid saturation change in the reservoir between the first time step and a second time step by comparing the first fluid saturation in the reservoir with a second fluid saturation in the reservoir for the second time step; and
   controlling wellbore production operations or wellbore injection operations at the first wellbore based on the fluid saturation change.

2. The method of claim 1, wherein interpolating the third set of multicomponent borehole gravity data comprises applying a simple kriging interpolation to the first set of multicomponent borehole gravity data and the second set of multicomponent borehole gravity data.

3. The method of claim 1, further comprising:
   collecting a fourth set of multicomponent borehole gravity data at the second time step along the first length of the first wellbore;
   collecting a fifth set of multicomponent borehole gravity data at the second time step along the second length of the second wellbore;
   interpolating a sixth set of multicomponent borehole gravity data at the second time step in the area between the first wellbore and the second wellbore using the fourth set of multicomponent borehole gravity data and the fifth set of multicomponent borehole gravity data; and
   determining the second fluid saturation at the second time step in the reservoir containing the first wellbore and the second wellbore using the fourth, fifth, and sixth sets of multicomponent borehole gravity data.

4. The method of claim 1, further comprising:
   generating a time-lapse, three-dimensional fluid saturation model indicating the fluid saturation change in the reservoir over time.

5. The method of claim 1, wherein the first and second sets of multicomponent borehole gravity data comprise x-components, y-components, and z-components.

6. The method of claim 1, wherein the second time step is at least one month after the first time step.

7. The method of claim 1, wherein the first wellbore comprises a gas injection wellbore, and the second wellbore comprises a production wellbore.

8. The method of claim 1, further comprising:
   identifying structural barriers in the reservoir using the fluid saturation change between the first time step and the second time step.

9. A well system comprising:
   a first set of gravity sensors positionable within a first wellbore;
   a second set of gravity sensors positionable within a second wellbore;
   a first communication device positionable to transmit a first set of multicomponent borehole gravity data from the first set of gravity sensors to a first surface of the first wellbore;
   a second communication device positionable to transmit a second set of multicomponent borehole gravity data from the second set of gravity sensors to a second surface of the second wellbore; and
   a computing device in communication with the first communication device and the second communication device, the computing device comprising:
   a processor; and
   a non-transitory computer-readable medium that includes instructions that are executable by the processor to perform operations comprising:
      receiving, from the first communication device, the first set of multicomponent borehole gravity data at a first time step along a first length of the first wellbore;
      receiving, from the second communication device, the second set of multicomponent borehole gravity data at the first time step along a second length of the second wellbore;
      interpolating a third set of multicomponent borehole gravity data at the first time step in an area between the first wellbore and the second wellbore using the first set of multicomponent borehole gravity data and the second set of multicomponent borehole gravity data, wherein the area between the first wellbore and the second wellbore is at least partially out of a first range of the first set of gravity sensors and a second range of the second set of gravity sensors;

generating a three-dimensional fluid saturation model of a reservoir at the first time step, wherein the reservoir contains the first wellbore, the second wellbore, and the area between the first wellbore and the second wellbore, and wherein the three-dimensional fluid saturation model is generated using the first set, the second set, and the third set of multicomponent borehole gravity data;

determining, based on the three-dimensional fluid saturation model, a first fluid saturation in the reservoir; and determining a fluid saturation change in the reservoir between the first time step and a second time step by comparing the first fluid saturation in the reservoir with a second fluid saturation in the reservoir for the second time step controlling wellbore production operations or wellbore injection operations at the first wellbore based on the fluid saturation change.

10. The well system of claim 9, wherein the first set of gravity sensors are positionable at regular intervals along the first length of the first wellbore.

11. The well system of claim 9, wherein the first wellbore comprises a gas injection wellbore, and the second wellbore comprises a production wellbore.

12. The well system of claim 9, wherein the first set of gravity sensors are removably positionable along a length of tubing within the first wellbore.

13. The well system of claim 9, wherein the second wellbore is at least 100 feet from the first wellbore.

14. The well system of claim 9, wherein the first wellbore comprises a horizontal wellbore.

15. A non-transitory computer-readable medium that includes instructions that are executed by a processing device to perform operations, the operations comprising:

collecting, from a first set of gravity sensors, a first set of multicomponent borehole gravity data at a first time step along a first length of a first wellbore;

collecting, from a second set of gravity sensors, a second set of multicomponent borehole gravity data at the first time step along a second length of a second wellbore;

interpolating a third set of multicomponent borehole gravity data at the first time step in an area between the first wellbore and the second wellbore using a simple kriging interpolation of the first set of multicomponent borehole gravity data and the second set of multicomponent borehole gravity data, wherein the area between the first wellbore and the second wellbore is at least partially out of a first range of the first set of gravity sensors and a second range of the second set of gravity sensors;

generating a three-dimensional fluid saturation model of a reservoir at the first time step, wherein the reservoir contains the first wellbore, the second wellbore, and the area between the first wellbore and the second wellbore, and wherein the three-dimensional fluid saturation model is generated using the first set, the second set, and the third set of multicomponent borehole gravity data;

determining, based on the three-dimensional fluid saturation model, a first fluid saturation in the reservoir; and determining a fluid saturation change in the reservoir between the first time step and a second time step by comparing the first fluid saturation in the reservoir with a second fluid saturation in the reservoir determined for the second time step controlling wellbore production operations or wellbore injection operations at the first wellbore based on the fluid saturation change.

16. The non-transitory computer-readable medium of claim 15, the operations further comprising:

collecting a fourth set of multicomponent borehole gravity data at the second time step along the first length of the first wellbore;

collecting a fifth set of multicomponent borehole gravity data at the second time step along the second length of the second wellbore;

interpolating a sixth set of multicomponent borehole gravity data at the second time step in the area between the first wellbore and the second wellbore using the fourth set of multicomponent borehole gravity data and the fifth set of multicomponent borehole gravity data; and determining the second fluid saturation at the second time step in the reservoir containing the first wellbore and the second wellbore using the fourth, fifth, and sixth sets of multicomponent borehole gravity data.

17. The non-transitory computer-readable medium of claim 15, wherein the operation of determining the first fluid saturation comprises generating a multicomponent, three-dimensional fluid saturation model.

18. The non-transitory computer-readable medium of claim 15, wherein the operation of determining the fluid saturation change comprises generating a time-lapse fluid saturation model.

19. The non-transitory computer-readable medium of claim 15, the operations further comprising:

identifying structural barriers in the reservoir using the fluid saturation change between the first time step and the second time step.

* * * * *